(12) United States Patent
Kuroyanagi et al.

(10) Patent No.: US 11,504,211 B2
(45) Date of Patent: Nov. 22, 2022

(54) DENTAL FILE

(71) Applicant: MANI, INC., Utsunomiya (JP)

(72) Inventors: Shinsaku Kuroyanagi, Utsunomiya (JP); Koichi Nabana, Utsunomiya (JP); Norio Maeda, Utsunomiya (JP)

(73) Assignee: MANI, INC., Tochigi (JP)

( * ) Notice: Subject to any disclaimer, the term of this patent is extended or adjusted under 35 U.S.C. 154(b) by 14 days.

(21) Appl. No.: 17/044,890

(22) PCT Filed: Apr. 10, 2019

(86) PCT No.: PCT/JP2019/015702
§ 371 (c)(1),
(2) Date: Oct. 2, 2020

(87) PCT Pub. No.: WO2019/198777
PCT Pub. Date: Oct. 17, 2019

(65) Prior Publication Data
US 2021/0145541 A1 May 20, 2021

(30) Foreign Application Priority Data

Apr. 10, 2018 (JP) .............................. JP2018-075740

(51) Int. Cl.
*A61C 5/42* (2017.01)
(52) U.S. Cl.
CPC .................................... *A61C 5/42* (2017.02)
(58) Field of Classification Search
CPC ...................................................... A61C 5/42
See application file for complete search history.

(56) References Cited

U.S. PATENT DOCUMENTS

| 4,299,571 A | 11/1981 | McSpadden |
| 5,713,736 A | 2/1998 | Heath et al. |
| (Continued) | | |

FOREIGN PATENT DOCUMENTS

| CN | 1372871 A | 10/2002 |
| CN | 101677838 A | 3/2010 |
| (Continued) | | |

OTHER PUBLICATIONS

Office Action dated Mar. 3, 2021 for the corresponding Iran Patent Application No. 10-2020-7029696 with partial English translation.
(Continued)

*Primary Examiner* — Nicholas D Lucchesi
*Assistant Examiner* — Hao D Mai
(74) *Attorney, Agent, or Firm* — Pearne & Gordon LLP (57) ABSTRACT

Provided is a dental file with excellent flexibility, cutting performance, and fracture resistance. The dental file (10) of the present invention has a spiral working portion (11) of which cross sections become smaller toward a tip end. At least one of shapes of the cross sections of the working portion (11) is a substantially rectangular shape formed of a single arc (40) and three lines (41, 42, 43), Two points of four points at four corners of the substantially rectangular shape are arranged on a virtual circle (50), which includes the arc (40) as part thereof. The other two points are arranged inside the virtual circle (50). The center position of the virtual circle (50) is inside the substantially rectangular shape. A shortest one of lengths of perpendicular lines each extending from the center position of the virtual circle (50) including the arc (40) as part thereof to the three lines (41, 42, 43) is equal to or greater than 45% and equal to or less than 65% of the radius of the virtual circle (50).

2 Claims, 4 Drawing Sheets

(56) References Cited

U.S. PATENT DOCUMENTS

| | | |
|---|---|---|
| 5,735,689 A | 4/1998 | McSpadden |
| 5,897,316 A | 4/1999 | Buchanan |
| 5,902,106 A | 5/1999 | McSpadden |
| 6,042,376 A | 3/2000 | Cohen et al. |
| 8,647,116 B2 | 2/2014 | Becker et al. |
| 9,066,773 B2 | 6/2015 | Tetsuka et al. |
| 9,113,980 B2 | 8/2015 | Rota et al. |
| 9,662,181 B2 | 5/2017 | Scianamblo |
| 9,801,696 B2 | 10/2017 | Rota et al. |
| 10,123,850 B2 | 11/2018 | Rota et al. |
| 10,932,884 B2 | 3/2021 | Rota et al. |
| 2002/0119418 A1 | 8/2002 | Matsutani et al. |
| 2003/0199236 A1 | 10/2003 | Aloise et al. |
| 2006/0014480 A1 | 1/2006 | Aloise et al. |
| 2009/0117831 A1 | 5/2009 | Matsutani |
| 2010/0173263 A1 | 7/2010 | Tetsuka et al. |
| 2011/0212413 A1 | 9/2011 | Becker et al. |
| 2012/0021376 A1 | 1/2012 | Iwamoto et al. |
| 2013/0244200 A1 | 9/2013 | Rota et al. |
| 2013/0337407 A1 | 12/2013 | Mordeniz et al. |
| 2014/0329199 A1 | 11/2014 | Becker et al. |
| 2015/0320517 A1* | 11/2015 | Rota ............ A61C 5/40 433/102 |
| 2016/0067012 A1 | 3/2016 | Breguet et al. |
| 2016/0128800 A1 | 5/2016 | Kim et al. |
| 2018/0008374 A1 | 1/2018 | Rota et al. |
| 2019/0046291 A1 | 2/2019 | Rota et al. |
| 2021/0145540 A1 | 5/2021 | Rota et al. |
| 2021/0145541 A1 | 5/2021 | Kuroyanagi et al. |

FOREIGN PATENT DOCUMENTS

| | | |
|---|---|---|
| CN | 202437374 U | 9/2012 |
| CN | 104739525 A | 7/2015 |
| CN | 204446150 U | 7/2015 |
| CN | 104902841 A | 9/2015 |
| CN | 105377178 A | 3/2016 |
| CN | 206044757 U | 3/2017 |
| CN | 206239536 U | 6/2017 |
| CN | 206518609 U | 9/2017 |
| CN | 206910405 U | 1/2018 |
| CN | 209548113 U | 10/2019 |
| CN | 111936080 A | 11/2020 |
| EP | 0 902 661 B1 | 5/2004 |
| EP | 1 354 566 B1 | 7/2010 |
| EP | 2 645 959 B1 | 3/2017 |
| EP | 3 045 142 B1 | 8/2017 |
| JP | H08-56961 A | 3/1996 |
| JP | 2002-253578 A | 9/2002 |
| JP | 2002-537892 A | 11/2002 |
| JP | 2003-310640 A | 11/2003 |
| JP | 4247346 B2 | 4/2009 |
| JP | 2016-504142 A | 2/2016 |
| KR | 2010-0068505 A | 6/2010 |
| KR | 101569202 B1 | 11/2015 |
| KR | 101629143 B1 | 6/2016 |
| RU | 2012-139198 A | 3/2014 |
| WO | 00/51516 A1 | 9/2000 |
| WO | 02/062251 A2 | 8/2002 |

OTHER PUBLICATIONS

Office Action dated Apr. 2, 2021 for the corresponding Russian Patent Application No. 2020134943.

International Search Report dated Oct. 8, 2019 issued for PCT/JP2019/033691 (U.S. Appl. No. 17/185,134 that is related to the present application).

Search Report dated Nov. 23, 2021 for the corresponding European Patent Application No. 19785635.4.

Office Action dated Dec. 3, 2021 for the corresponding Indian Patent Application No. 202027042938.

Chinese Office Action dated Jun. 3, 2021 issued in Chinese Patent Application No. 201980024327.3.

International Search Report issued in Patent Application No. PCT/JP2019/015702 dated Jun. 18, 2019.

Office Action dated Jan. 21, 2022 for the corresponding Korean Patent Application No. 10-2020-7029696.

Office Action dated Jan. 21, 2022 for Indian Patent Application No. 202127008526.

Office Action dated Mar. 10, 2022 for the Chinese Patent Application No. 201980055736.X.

Chinese Office Action dated Jul. 21, 2022 for the Chinese Patent Application No. 201980055736.X.

Office Action dated Sep. 13, 2022 for the corresponding Brazilian Patent Application No. BR1120200196827.

\* cited by examiner

DENTAL FILE

TECHNICAL FIELD

The present invention relates to a dental file used for expanding/cleaning a root canal in dental treatment.

BACKGROUND ART

There is a reamer or a file as a dental root canal cutting tool used for expanding or cleaning a root canal in dental treatment (see Patent Literature 1). The reamer is mainly for cutting the inside of the root canal by rotation, and the file is for cutting the inside of the root canal by rotation or back-forth movement in an axial direction.

A typical dental root canal cutting tool is made of stainless steel. However, in recent years, a highly-elastic nickel titanium product suitable for treatment of a curved root canal has been sometimes used. Further, not only a manual type but also an electric type connected to a dental hand piece (an engine) upon use has been increasing in terms of power. The electric type allows quick treatment.

Figure 7:
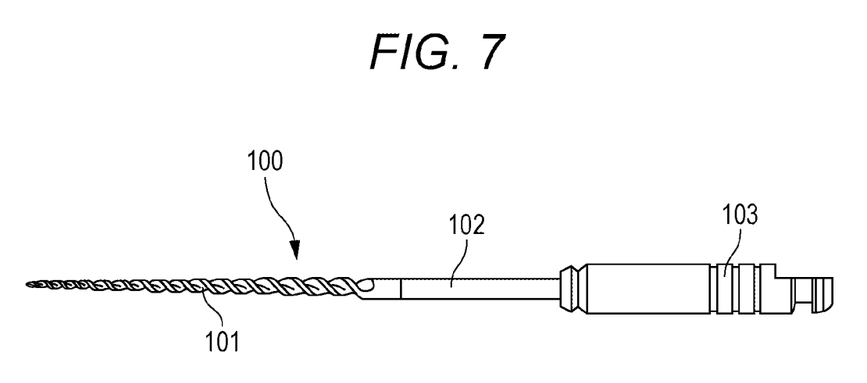
FIG. 7 is a plan view of a general dental file.

FIG. 7 is a plan view of a general dental file. The dental file 100 described herein is connected to a dental hand piece upon use. The dental file 100 has a working portion 101 including a spiral cutting blade in a shape narrowing toward a tip end, a shaft 102 formed continuously to a back end of the working portion 101, and a gripping portion 103 formed continuously to a back end of the shaft 102 and attached to the dental hand piece.

In the general method for manufacturing the dental file described above, working is first performed such that a portion to be the working portion is formed from a thin wire rod with a certain taper rate 6/100) by a centerless processing machine. Thereafter, a groove to be the cutting blade of the working portion is formed by a blade groove grinding machine. If working is performed using a thick wire rod, the tapered portion to be the working portion and the groove to be the cutting blade can be technically formed at the same time. However, due to a great grinding amount and easy damage of a grinding stone a method in which a thin wire rod is ground at two stages of tapered portion formation and cutting blade formation is often employed. In the case of a nickel titanium dental file, the grinding stone is particularly vulnerable, and for this reason, such a dental file is preferably formed from a thin wire rod.

Main performance required for the dental file includes, for example, flexibility which can follow the root canal in a complicated shape, cutting performance which can properly cut the root canal, and fracture resistance which avoids damage during processing. Higher performance can result in easier and quicker root canal formation, and therefore, a burden on a practitioner and a patient can be reduced.

CITATION LIST

Patent Literature

Patent Literature 1: Japanese Patent No. 4247346

SUMMARY OF INVENTION

Problems to be Solved by Invention

In view of the above-described situation, the present invention is intended to provide a dental file having high performance in terms of flexibility, cutting performance, and fracture resistance.

Solution to Problems

In order to achieve the objective described above, a dental file according to the present invention includes: a spiral working portion of which cross sections become smaller toward a tip end. At least one of shapes of the cross sections of the working portion is a substantially rectangular shape formed of a single arc and three lines. Two points of four points at four corners of the substantially rectangular shape are arranged on a virtual circle, which includes the arc as pan thereof. The other two points are arranged inside the virtual circle. A center position of the virtual circle is inside the substantially rectangular shape. A shortest one of lengths of perpendicular lines each extending from the center position of the virtual circle to the three lines is equal to or greater than 45% and equal to or less than 65% of a radius of the virtual circle.

Further, the spiral shape of the working portion may be configured such that a spiral pitch narrows toward the tip end

Effects of Invention

According to the dental file of the present invention, an advantageous effect that high performance can be provided in terms of flexibility, cutting performance, and fracture resistance is provided. With the configuration in which the spiral pitch narrows toward the tip end, a lifting load from a root canal can be reduced, and a root canal formation process can be more easily performed.

DESCRIPTION OF EMBODIMENTS

Hereinafter, an embodiment of the present invention will be described with reference to the attached drawings.

FIG. 1(a) is a plan view of a dental file of the present invention, and FIG. 1(b) is an enlarged A-A sectional view.

The dental file 10 has a working portion 11 configured to cut a root canal, a shaft 12 formed continuously to a back end of the working portion 11, and a gripping portion (not shown) formed continuously to a back end of the shaft 12 and attached to a dental hand piece. The working portion 11 described herein is in a tapered shape of which cross sections become smaller toward a tip end, and is configured such that similar cross sections are connected to each other in a spiral shape. The sectional shape of the working portion 11 at an optional position is a substantially rectangular shape of which outer edge is formed of three lines 41, 42, 43 and a single arc 40 (hereinafter referred to as a "land"). That is, it means that the outline of the sectional shape is a rectangular shape and three lines 41, 42, 43 are straight lines or curved lines close to straight lines. Note that details of the sectional shape of the working portion 11 will be further described later.

Figure 2:
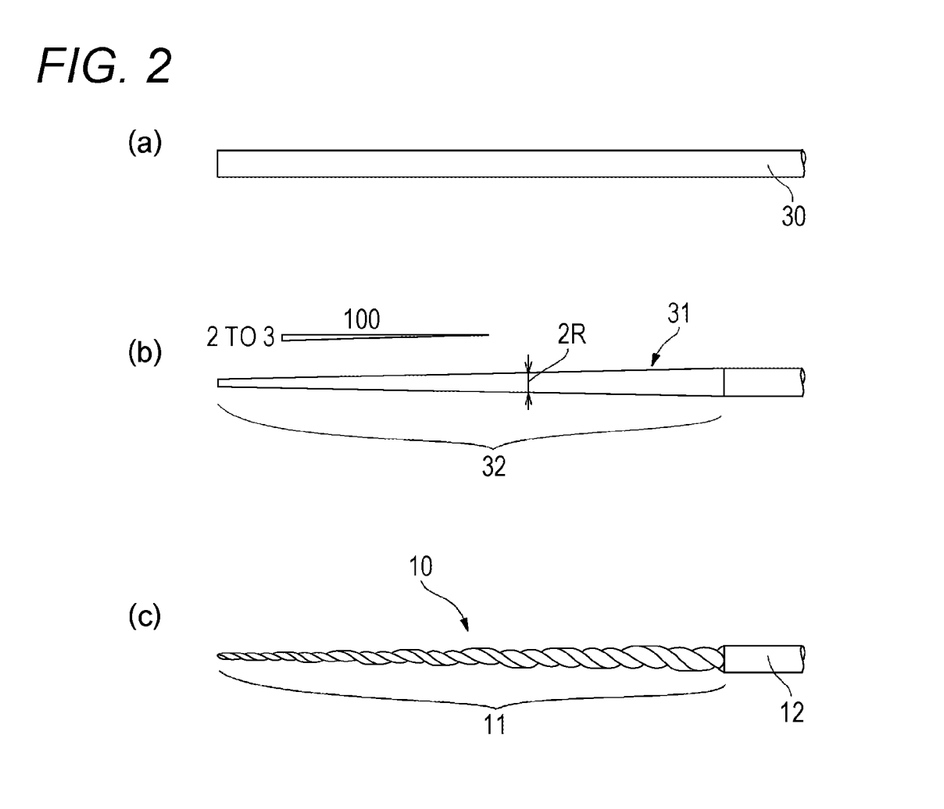
FIGS. 2(a) to 2(c) show views for describing the steps of manufacturing the dental file, FIG. 2(a) being a plan view of a wire rod, FIG. 2(b) being a plan view of a tapered member, and FIG. 2(c) being a plan view of the dental file.

FIGS. 2(*a*) to 2(*c*) show views for describing the steps of manufacturing the dental file, FIG. 2(*a*) being a plan view of a wire rod, FIG. 2(*b*) being a plan view of a tapered member, and FIG. 2(*c*) being a plan view of the dental file. The working portion 11 of the dental file 10 is formed by the following manufacturing steps.

First, the wire rod 30 as a nickel titanium product is prepared. The cross section of the wire rod 30 is in a circular shape, and the length thereof is determined based on the length of the dental file 10 as a finished product. The nickel titanium product is used because such a product is a material rich in elasticity and easily follows the root canal in a complicated shape.

Next, the wire rod 30 is ground, and in this manner, the tapered member 31 having a tapered portion 32 narrowing toward a tip end at a constant rate is formed. The tapered portion 32 is a portion to be the working portion 11 of the finished product, and therefore, is in a conical shape with a length and a taper rate corresponding to those of the working portion 11. Assuming that the radius of the cross section of the tapered portion 32 at an optional position is R, the rate of change in a diameter 2R in an axial direction is the taper rate, and such a taper rate can be a predetermined value of 4/100 to 6/100 (an inclination on one side is 2/100 to 3/100), for example.

Figure 1:
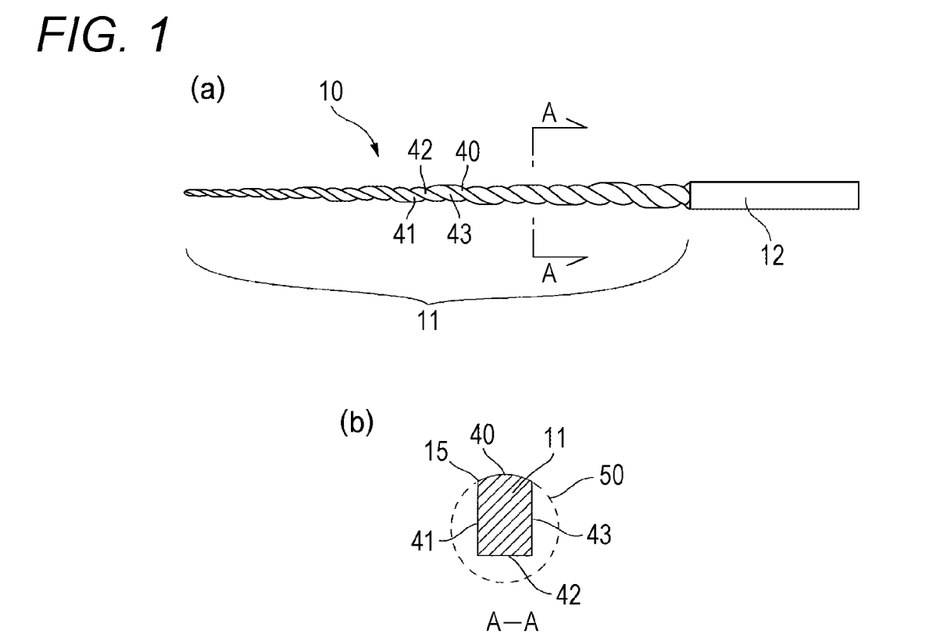
FIG. 1(a) is a plan view of a dental file.
FIG. 1(b) is an enlarged A-A sectional view.

Finally, the tapered portion 32 is further ground such that the sectional shapes of FIG. 1(*b*) are connected to each other in the spiral shape. In this manner, the working portion 11 is formed.

Figure 3:
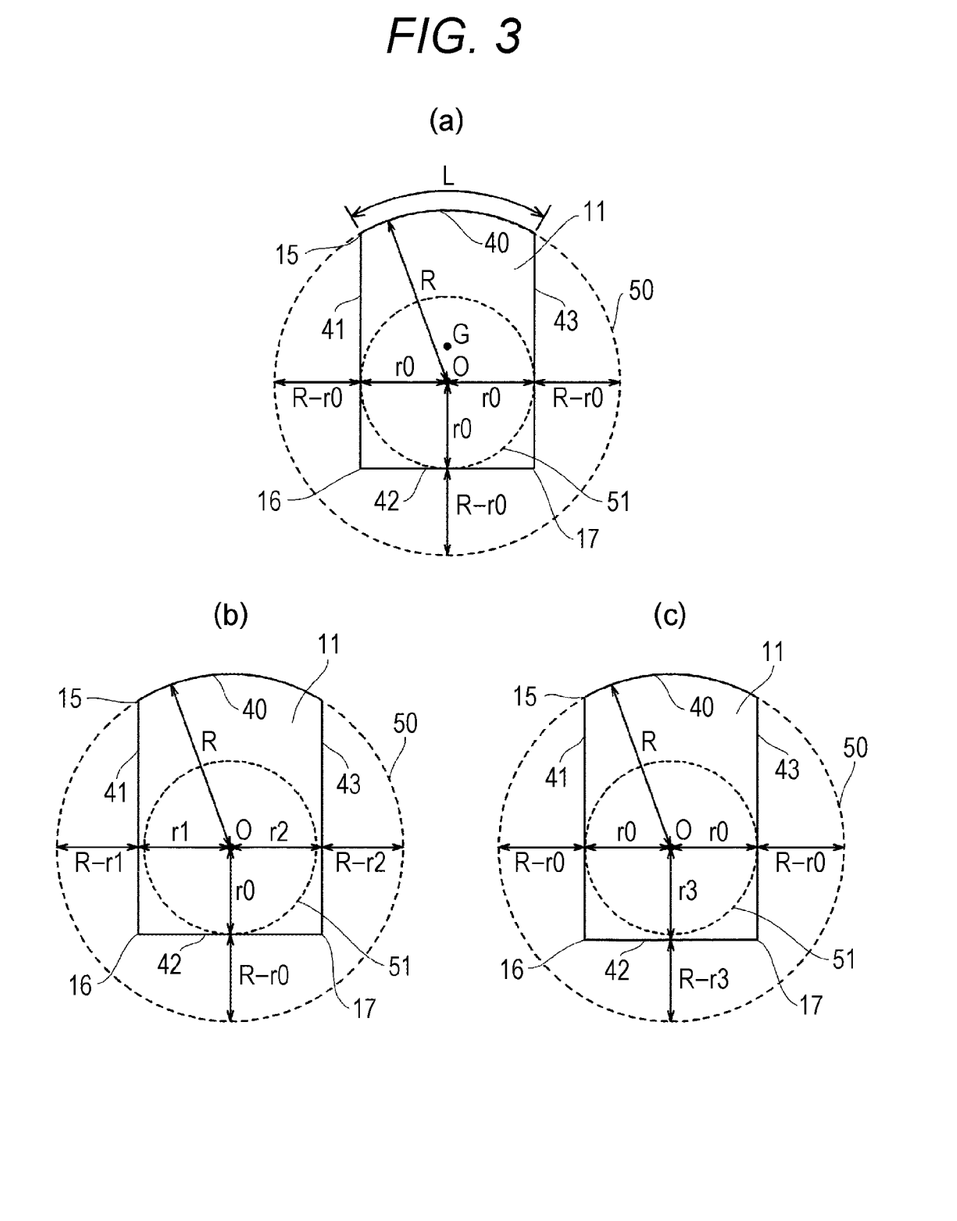
FIGS. 3(a) to 3(c) show views for describing the sectional shape of the dental file, FIG. 3(a) being a view of a core contacting three sides, FIG. 3(b) being a view of the core contacting one side, and FIG. 3(c) being a view of the core contacting two sides.

FIGS. 3(*a*) to 3(*c*) shows views for describing the sectional shape of the dental file, FIG. 3(*a*) being a view of a core contacting three sides, FIG. 3(*b*) being a view of the core contacting one side, and FIG. 3(*c*) being a view of the core contacting two sides.

In the sectional shape of the working portion 11, the land 40 is not ground to remain forming a surface of the tapered portion 32, and only portions of three lines 41, 42, 43 are formed by grinding. The line 41 and the line 42 as described herein are perpendicular to each other, and the line 42 and the line 43 as described herein are perpendicular to each other. That is, the line 41 and the line 43 are parallel with each other, and the line 42 is perpendicular to any of the line 41 and the line 43. Moreover, an intersection between the line 41 and the land 40 forms a cutting blade 15. Thus, for forming the rake angle of the cutting blade 15, the line 41 is sometimes a slightly-curved line. Further, since the working portion 11 is in the spiral shape, it is difficult to grind the line 42 and the line 43 as perfect straight lines, and it is assumed that these lines are curved lines close to straight lines. Thus, in some cases, the line 41 and the line 43 are not completely parallel with each other, and an angle between the line 42 and the line 41 and an angle between the line 42 and the line 43 are not 90°. Note that these lines are gently-curved lines, and therefore, it can be considered that the outline of the sectional shape of the working portion 11 is the rectangular shape. Thus, the lines 41, 42, 43 will be described below as straight lines.

It is assumed that the axial center position of the tapered member 31 is 0 and the radius of the tapered portion 32 in the cross section at the optional position is R. Moreover, it is assumed that in the dental file 10 as the finished product, a circle with the radius R about the axial center position O is a virtual circle 50. That is, the land 40 is part of the virtual circle 50, and therefore, points at both ends of the land 40 are on the virtual circle 50. Moreover, the axial center position O is the center position O of the virtual circle 50, and needless to say, the center position O is positioned inside the substantially rectangular shape as the sectional shape of the working portion 11.

A distance from the center position O of the virtual circle 50 to each of three lines 41, 42, 43 is the length of a line extending perpendicularly to each of three lines 41, 42, 43 from the center position O. Assuming that the length of a shortest one of these perpendicular lines is r0, a circular portion with the radius r0 about the center position O is a portion formed continuously across the entire length of the working portion 11 in the spiral shape, and is the core 51 of the dental file 10. Note that the radius r0 decreases toward the tip end of the dental file 10, and therefore, the core 51 is in a conical shape narrowing toward a tip end.

FIG. 3(*a*) is the view in a case where the lengths of the lines perpendicular to the lines 41, 42, 43 are equal to each other. In other words. FIG. 3(*a*) is the view in a case where the core 51 contacts the lines 41, 42, 43 as three sides of the cross section of the working portion 11. Thus, the cross section of the working portion 11 is formed in such a manner that the circular cross section of the tapered portion 32 is ground from three directions by a depth of (R-r0). Note that the case where the lengths of the perpendicular lines are equal to each other as described above is taken as a basic case, but the lengths of the perpendicular lines may be different values.

FIG. 3(*b*) is the view in a case where the length r0 of the line perpendicular to the line 42 is shortest. In other words, FIG. 3(*b*) is the view in a case where the core 51 contacts only the line 42 as one side of the cross section of the working portion 11. Assuming that the lengths of the perpendicular lines other than r0 are r1 and r2, r0<r1 and r0<r2 are satisfied, and in some cases, r1=r2 is satisfied. Note that although not shown in the figure, the line that the core 51 contacts is the line 41 or the line 43 in some cases, and in this case, the position of the shortest perpendicular line is different. Moreover, the cross section of the working portion 11 is formed in such a manner that the circular cross section of the tapered portion 32 is ground from three directions by depths of (R-r0), (R-r1), and (R-r2).

FIG. 3(*c*) is the view in a case where the lengths r0, r0 of the lines perpendicular to the lines 41, 43 are shortest. In other words, FIG. 3(*c*) is the view in a case where the core 51 contacts the lines 41, 43 as two sides of the cross section of the working portion 11. Note that although not shown in the figure, two sides that the core 51 contacts may be the line 41 and the line 42 or the line 42 and the line 43. Moreover, the cross section of the working portion 11 is formed in such a manner that the circular cross section of the tapered portion 32 is ground from three directions by depths of (R-r0), (R-r0), and (R-r3).

Figure 4:
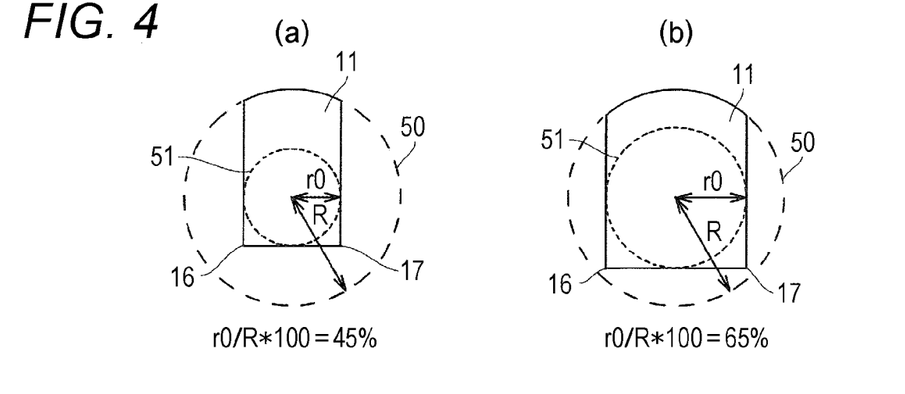
FIGS. 4(a) and 4(b) show views for comparing the sectional shape in terms of a difference in a core rate, FIG. 4(a) being a core rate of 45% and FIG. 4(b) being a core rate of 65%.

Assuming that the percentage (r0/R×100) of the core radius r0 with respect to the virtual circle radius R is taken as a core rate, the core rate is a constant value across the entire length of the working portion 11. Specifically, the core rate is preferably equal to or greater than 45% and equal to or less than 65%. FIGS. 4(*a*) and 4(*b*) show views for comparing the cross sectional shape in terms of a difference in the core rate, FIG. 4(*a*) being a core rate of 45% and FIG. 4(*b*) being a core rate of 65%. Note that a case where the core 51 contacts three sides of the cross section of the working portion 11 will be described herein as an example.

If the core rate is less than 45%, the sectional shape of the working portion 11 is a substantially rectangular shape having a more-elongated cross section than that of FIG. 4(*a*), leading to a problem that strength is insufficient. When the core rate is about 70%, an intersection 16 between the line 41 and the line 42 and an intersection 17 between the line 42 and the line 43 are substantially on the virtual circle 50. Thus, upon cutting of the root canal, these intersections 16, 17 tend to bite in a wall of the root canal, leading to a problem that flexibility and fracture resistance are influenced. For this reason, any of the intersection 16 between the line 41 and the line 42 and the intersection 17 between the line 42 and the line 43 is arranged inside the virtual circle 50. In this case, the intersections 16, 17 might contact the root canal wall at a curved portion of the root canal, but such contact does not lead to degradation of the flexibility and the fracture resistance. On the contrary, it is also assumed that the intersections 16, 17 function as cutting blades for gently cutting the root canal and contribute to cutting performance.

Assuming that the position of the center of gravity of the cross section of the working portion 11 is G, the center position O and the gravity center G shift to the land 40 as shown in FIG. 3(*a*) because three lines 41, 42, 43 are formed. Such a state is called off-center. The dental file 10 of the present invention is off-centered, and therefore, is characterized in that the dental file 10 has excellent flexibility and fracture resistance and has favorable cutting-piece discharging performance to smoothly cut the root canal.

By a test, it has been confirmed that better performance such as the flexibility and the fracture resistance can be provided in such a manner that the core rate is set to equal to or greater than 60% and equal to or less than 65% when the taper rate is 4/100 and the core rate is set to equal to or greater than 55% and equal to or less than 60% when the taper rate is 6/100.

In the case of FIG. 3(*a*), a land length L is obtained according to $L=2R \times \arcsin(r0/R)$. With the determined core rate, the land length L can be obtained. For example, in a case where the core rate is equal to or greater than 45% and equal to or less than 65%, the land length L is $0.93R \leq L \leq 1.42R$. That is, in a case where the core 51 contacts three sides of the working portion cross section, the dental file 10 of the present invention can be defined within a range of equal to or greater than 0.95 R and equal to or less than 1.40 R in units of land length L instead of the core rate.

Figure 5:
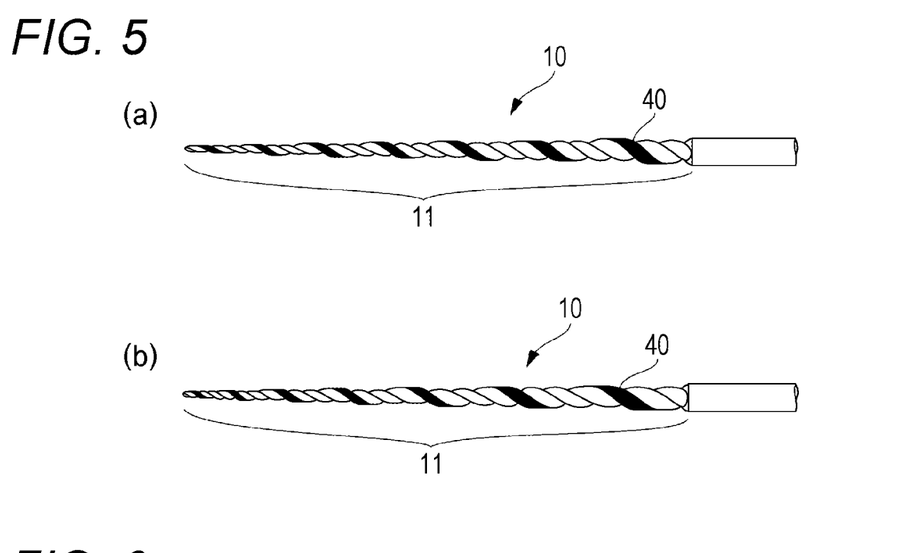
FIGS. 5(a) and 5(b) show views for comparison among different spiral pitches of a working portion, FIG. 5(a) showing a dental file with equal pitches and FIG. 5(b) showing a dental file with pitches narrowing toward a tip end.

For obtaining a dental file with better performance, performance comparison was made among different spiral pitches of the working portion. FIGS. 5(*a*) and 5(*b*) show views for comparison among different spiral pitches of the working portion, FIG. 5(*a*) showing a dental file with equal pitches and FIG. 5(*b*) showing a dental file with pitches (hereinafter referred to as a "front-narrower pitch") narrowing toward a tip end. Note that for clarifying the pitch, visible portions of the land 40 are shown as black. The dental file with equal pitches is configured such that all pitches are the same as each other, but the dental file with the front-narrower pitches is configured such that the pitch narrows toward the tip end. Note that contrary to FIG. 5(*b*), a product configured such that a pitch expands toward a tip end is also conceivable. However, in this case, strength in the vicinity of the tip end is weak and deformation is easily caused, and for this reason, such a product is excluded from comparison targets.

As a comparison test, a screwing test for estimating the force of moving the working portion 11 to a root apex and comparison of a lifting load when the working portion 11 is pulled out of the root canal were conducted. As a result, the force of moving the working portion 11 to the root apex was at the substantially same level even when the pitch had been changed, but the lifting load was lower in the case of the front-narrower pitch. It is assumed that this is because the root-side pitch of the working portion 11 is greater in the case of the front-narrower pitch and, therefore, the rake angle of the cutting blade 15 is obtuse with respect to the root canal wall and resistance decreases.

Thus, it has been confirmed that for further enhancing performance of the dental file 10, it is effective to decrease the spiral pitch toward the tip end.

Figure 6:
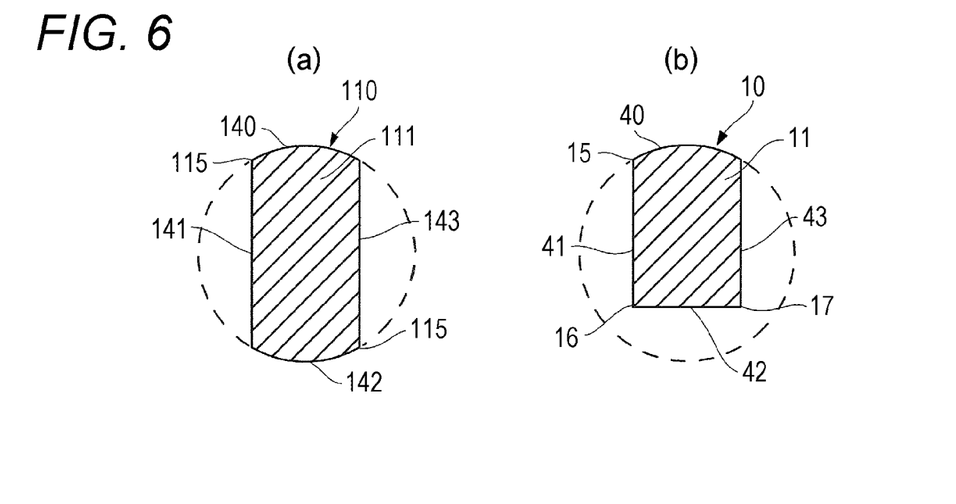
FIGS. 6(a) and 6(b) show the sectional shapes of working portions targeted for performance comparison, FIG. 6(a) showing the cross section of a typical product and FIG. 6(b) showing the cross section of the present invention.

For evaluating the performance of the dental file of the present invention, performance comparison with a typical product was conducted. FIGS. 6(*a*) and 6(*b*) show the sectional shapes of working portions targeted for performance comparison, FIG. 6(*a*) showing the cross section of the typical product and FIG. 6(*b*) showing the cross section of the present invention. The cross section of the working portion 111 of the typical product is in a substantially rectangular shape formed of parallel lines 141, 143 and opposing lands 140, 142, and cutting blades 115 are formed at two locations. On the other hand, the cross section of the working portion 11 according to the present invention is in the substantially rectangular shape formed of the single land 40 and three lines 41, 42, 43, and the cutting blade 15 is only at the single location.

First, for comparing the flexibility and the cutting performance, a root canal followability test was conducted. The root canal followability test is a test for evaluating whether or not the root canal wall is equally cut when the working portion 111, 11 is inserted into and cuts an S-shaped root canal model resembling the root canal. That is, the root canal followability test is a test for evaluating whether or not great cutting (transportation) of the root canal wall only on one side can be reduced.

As a result of the root canal followability test, the dental file 10 of the present invention more equally cut the root canal wall as compared to the dental file 110 as the typical product, and therefore, it has been confirmed that the dental file 10 of the present invention has more excellent root canal followability. It is assumed that as reasons for such a result, the cross section of the working portion 11 according to the present invention has higher flexibility due to a smaller second moment of area than that of the typical product and there is a greater clearance between the working portion and the root canal wall as compared to the typical product due to the land at the single location and the off-centered cross section. Thus, it is assumed that the dental file 10 of the present invention has such a structure that the dental file 10 can easily follow even the root canal shape curved in, e.g., an S-shape. Further, the dental file 10 of the present invention has the land with a moderate length and has the cutting blade 15 at the single location, and therefore, the root canal is not extremely cut and can be moderately cut. In addition, at the curved portion of the root canal, the intersections 16, 17 contact the root canal wall and function as the cutting blades for gently cutting the root canal. Thus, it is assumed that even the root canal wall curved in, e.g., the S-shape can be equally cut.

For comparing the fracture resistance, a torsion fracture angle comparison test and a fatigue fracture test were conducted. Torsion fracture angle comparison is a test for twisting a dental file to measure an angle upon fracture. The angle was 680° in the typical product, and was 590° in the file of the present invention. A fracture angle is smaller in the file of the present invention, but any of the dental files could obtain a torsion fracture angle of equal to or greater than 500°. Thus, both of the dental files have no problem in performance. Moreover, the fatigue fracture test is a test for inserting a dental file into a tool resembling the curved root canal to measure the number of rotations until fracture. In the fatigue fracture test, the number of rotations was 2800 in the typical product, and was 3950 in the file of the present invention. The result shows that fatigue resistance is better in the file of the present invention than in the typical product by 1.4 times or more. It is assumed that this is because the working portion 11 according to the present invention has high flexibility due to the land at the single location, the off centered cross section, and the moderate length of the land and it is less likely to accumulate fatigue in response to a pressure from the root canal wall.

As described above, it has been confirmed that the dental file of the present invention has excellent performance in terms of any of the flexibility, the cutting performance, and the fracture resistance.

LIST OF REFERENCE NUMERALS 10 dental file
11 working portion
12 shaft
15 cutting blade
16, 17 intersection
30 wire rod
31 tapered member
32 tapered portion
40 arc (land)
50 virtual circle
51 core
R virtual circle radius
r0 core radius (shortest perpendicular line length)
L land length

What is claimed is:

1. A dental file comprising:
a spiral working portion of which cross sections become smaller toward a tip end,
wherein at least one of shapes of the cross sections of the working portion is a substantially rectangular shape formed of a single arc and three lines,
two points of four points at four corners of the substantially rectangular shape are arranged on a virtual circle, which includes the arc as part thereof, the other two points are arranged inside the virtual circle,
a center position of the virtual circle is inside the substantially rectangular shape, and
wherein the three lines each has a virtual perpendicular line extending perpendicularly therefrom and toward the center position of the virtual circle, a shortest one of lengths of the virtual perpendicular lines is equal to or greater than 45% and equal to or less than 65% of a radius of the virtual circle.

2. The dental file according to claim 1, wherein
a spiral shape of the working portion is configured such that a spiral pitch narrows toward the tip end.

* * * * *

UNITED STATES PATENT AND TRADEMARK OFFICE
CERTIFICATE OF CORRECTION

| | |
|---|---|
| PATENT NO. | : 11,504,211 B2 |
| APPLICATION NO. | : 17/044890 |
| DATED | : November 22, 2022 |
| INVENTOR(S) | : Shinsaku Kuroyanagi et al. |

It is certified that error appears in the above-identified patent and that said Letters Patent is hereby corrected as shown below:

In the Specification

Column 2, Line 10, "includes the arc as pan thereof" should read -- includes the arc as part thereof --

Signed and Sealed this
Thirty-first Day of October, 2023

Katherine Kelly Vidal
*Director of the United States Patent and Trademark Office*